United States Patent [19]

Persoon

[11] 4,327,354

[45] Apr. 27, 1982

[54] LEARNING DEVICE FOR DIGITAL SIGNAL PATTERN RECOGNITION

[75] Inventor: Eric H. J. Persoon, Eindhoven, Netherlands

[73] Assignee: U.S. Philips Corporation, New York, N.Y.

[21] Appl. No.: 90,806

[22] Filed: Nov. 1, 1979

[30] Foreign Application Priority Data

Nov. 3, 1978 [NL] Netherlands ............... 7810943

[51] Int. Cl.³ ............................................. G06K 9/00
[52] U.S. Cl. .................................. 340/146.3 MA
[58] Field of Search .......... 340/146.3 MA, 146.3 AQ, 340/146.3 AC, 146.3 R, 146.3 AE; 364/515, 490; 356/400, 373, 375; 358/101, 103, 106–109

[56] References Cited

U.S. PATENT DOCUMENTS

| | | | |
|---|---|---|---|
| 3,016,518 | 1/1962 | Taylor | 340/146.3 MA |
| 3,088,096 | 4/1963 | Steinbuch | 340/146.3 MA |
| 3,701,095 | 10/1972 | Yamaguchi et al. | 340/146.3 MA |
| 3,846,755 | 11/1974 | Hart | 340/146.3 G |
| 3,936,800 | 2/1976 | Ejiri et al. | 340/146.3 AE |
| 4,005,385 | 1/1977 | Joynson et al. | 340/146.3 AE |

*Primary Examiner*—Leo H. Boudreau
*Attorney, Agent, or Firm*—Thomas A. Briody; William J. Streeter; Edward W. Goodman

[57] ABSTRACT

A device for recognizing overall patterns of digital signals which are arranged according to at least one coordinate comprises: first storage means for the storage of a pattern to be presented for comparison; a window device for selecting a local pattern of a number of digital signals from the overall pattern; a stepping mechanism for coordinate-wise adjustment of the window device over a step; a gradient determining device for determining, for predetermined coordinate values within the window, the absolute value of the coordinate-wide gradient of the values of the digital signals prevailing at said coordinate values; a moment generator for receiving these absolute values, for determining the moment therefrom with respect to a focussing point of the window, and for generating an output signal when a predetermined minimum value of said moment is reached in order to indicate the reaching of a local maximum in said coordinate-wise gradient; second storage means for the storage of a number of reference patterns; and a difference determining device for comparing, under control of the output signal of the moment generator, a local pattern selected by the window device with the reference patterns and for alternatively forming a non-correspondence/correspondence signal. If the difference is too large, the "new" pattern is stored as a further reference, so that the learning phase and the use phase occur simultaneously. The comparison does not take into account a difference near substantially coincident acute amplitude gradients.

10 Claims, 21 Drawing Figures a - b   0      b - c   4
a - c   4

LEARNING DEVICE FOR DIGITAL SIGNAL PATTERN RECOGNITION

BACKGROUND OF THE INVENTION

The invention in general relates to the recognition of patterns such as embodied in a collection of digital signals. Known objects for such recognition are binarized characters (letters, digits), blood corpuses, chromosomes, radar images of aeroplanes. Other visible patterns in this respect are series of code digits, mutilated or not, human voice patterns, and so on. The invention notably concerns a device for recognizing a pattern of a predetermined number of separate digital signals which are arranged according to at least one coordinate and each of which has a signal value, the device comprising an input with first storage means for receiving and storing said pattern, second storage means with a predetermined number of storage locations, each of which has a storage capacity for a corresponding pattern, a difference determining device with a first input which is connected to a data output of the first storage means, a second input which is connected to a data output of the second storage means, and an output for alternatively supplying a non-correspondence/correspondence signal.

The coordinates may be the x-direction and the y-direction in the case of a two-dimensional image, the time in the case of a series of code bits received, and the time and the pitch in the case of a voice pattern. The number of coordinates may be 1, 2, 3 or even more. The signal value may concern the density or colour code in the case of two-dimensional images, the intensity of the sound in the case of a voice pattern, etc. The recognition of unknown patterns has since long received attention and forms the subject of many articles and Patent Specifications. The following description relates notably to the recognition of two-dimensional, static images. However, as has already been stated, the invention can also be used for other patterns. The invention is based on the idea that many patterns are a combination of components which are already significant themselves. For example, medical X-ray images may contain a number of details such as parts of a skeleton. Other images contain, for example, individual chromosomes or blood corpuscles which are to be counted and/or identified.

SUMMARY OF THE INVENTION

The invention recognizes the fact that the information is largely contained in such sub-images which have large gradients (that is to say, for example, gradients in the intensity of an image). Therefore, it is an object of the invention to provide a device which utilizes, for the recognition of local patterns, the specific properties of the gradients in the signal value preferably present therein, so that inter alia exactly such gradient-rich local patterns can be compared with the reference information. The object in accordance with the invention is realized first of all in that for the recognition of a local pattern which is selected from an overall pattern by way of a coordinate-wise adjustable window device, the window device comprises a stepping mechanism in order to be adjusted coordinate-wise over a step, a gradient determining device being provided for determining, for predetermined coordinate values within the window, the absolute value of a coordinate-wise gradient of the values of said digital signals prevailing at said coordinate values, a moment generator for receiving said absolute values and for determining a moment thereof with respect to a reference point of the window, and for generating an output signal when a predetermined minimum value of said moment is reached in order to indicate that a local high value is reached of the value of said coordinate-wise gradient averaged over the local pattern, a connection being provided for supplying said output signal as an activation signal to said difference determining device.

For example, the unknown image can be continuously scanned, in which case the time or the location constitutes the independent variables. In that case, each time the moment is determined and the comparison is started in reaction to focussing (in time or location) to a maximum of the value of the coordinate-wise gradient as averaged over the local pattern. Thus, this may be zero crossing of a device which differentiates this averaged value with respect to time. The formation of the moment is realized so that a focussing to a maximum value is indeed realized (i.e. not to a minimum value, because this would produce only little information as follows from the foregoing). The gradient can be determined in various manners. Said moment may be a first moment or a higher moment.

A representative example of the state of the art is provided by an article by S. Kashioka et al, A transistor wire-bonding system utilizing multiple local pattern matching techniques, IEEE Transactions on systems, man and cybernetics, August 1976, Vol. SMC-6, No. 8, pages 562–570. According to this article, sub-images are directly compared during scanning, without said intermediate focussing to a relevant reference point. This means that only a small number of reference patterns can be used, because numerous comparisons take place, i.e. directly during the scanning of the image. According to the foregoing, comparison takes place only after proper focussing of the window device. Furthermore, in accordance with said article the tolerable differences are small. This means that operation is possible only in an environment with few variables. Prior art deals only with the localizing of transistors where only a two-dimensional translation and a rotation are possible. The known technique is not successful if the object has dimensional variations, so that the distance between the details can vary.

Preferably, there is provided a preadjustment stepping mechanism in order to impart, by way of a predetermined number of preadjustment steps, a corresponding number of starting positions to the window device, an output of the preadjustment stepping mechanism being connected to an input of the moment generator in order to activate the latter only after a starting position has been reached.

Each of the starting positions may produce one ultimate focussing and hence also one comparison. When the starting positions are suitably distributed, an extensive pattern can be examined for significant details. Near each of the starting positions, a local maximum value of the previously stated coordinate-wise gradient may be found, for example, in that a predetermined sequence of window steps is executed after the start from a starting position. It may be that the ultimate focussing is reached from two or even more starting positions. If desired, this can be prevented by way of an additional device which memorizes which locations have already been examined and which supplies the difference determining device with a de-activation signal when such a location is reached a second time.

The pattern can thus be systematically examined by way of suitable spacing of said starting positions.

Preferably, there is provided a feedback connection between an output of the moment generator and an activation input of the stepping mechanism in order to supply the stepping mechanism with a step direction signal. After adjustment to a starting position, the window is then each time step-wise displaced in the correct direction in order to minimize said moment as quickly as possible. Thus, automatic focussing is realized and only few steps are required to reach the ultimate focussing.

FURTHER ASPECTS OF THE INVENTION

Preferably, there is provided a termination element for imposing an upper limit to the number of steps which can be activated from a starting position by a step direction signal applied to the stepping mechanism. Thus, the further focussing of the window is terminated if the number of steps would become too high. This number of steps may become high if no local maximum value of the coordinate-wise gradient is present in a given zone (but only, for example, a local minimum value); the ultimate focussing can then also be reached from a difference starting position. This avoids the double focussing to utlimately the same point. A further case where many steps are likely to occur is the case where the local pattern presented for comparison is subject to a time dependent noise phenomenon. This may be due, for example, to small level shifts in A/D converters. The optimum focussing of the window device may then also be time dependent, so that the same steps are made repeatedly. In that case, the use of said termination element again reduces the loss of time.

Preferably, for the recognition of a local pattern selected from an overall pattern by means of a window device which can be focussed coordinate-wise, the window device comprises a stepping mechanism in order to be focussed coordinate-wise over a step, a gradient determining device being provided for determining, for predetermined coordinate values within the window, the absolute value of a coordinate-wise gradient of the values of said digital signals prevailing at said coordinate values, the difference determining device comprising means which serve to ignore the predetermined difference generated for a given coordinate value if a pair of signals from first and second storage means which is presented for comparison exhibits a predetermined difference for said coordinate value while the relevant patterns both have a predetermined coordinate-wise gradient in the signal value for said coordinate value. In the case of a binary image, said predetermined difference is a difference between "1" and "0". In the case of a multivalent image, a given difference in density or colour may be concerned. The gradient can be determined in the same manner as when the window is focussed or in a different manner. As a result of said ignoring, for example, small shifts in the edge of a character portion or small differences in the instant or arrival of a modification in a signal amplitude are considered not to make a contribution to a difference. It has been found that this offers a substantial saving as regards the number of patterns to be stored in the second storage means. Suitable identification is still possible, even in the case of a smaller number of patterns stored. Thus, a favourable compromise is realized between on the one hand the occurrence of gradients of the signal value within the local pattern (such as stored in the second storage means) and on the other hand a permissible tolerance in the coordinate value where such a gradient occurs. This results in an accurately dosed tolerance in the permissible differences between reference and the object to be examined.

Preferably, there are provided third storage means for storing, under the control of a correspondence signal from the difference determining device, a reference position of the window device then prevailing and an address signal for the second storage means. As a result of this storage, an image can be referenced which is composed, in a manner not known in advance, of a number of known parts or sub-patterns.

Preferably, there is provided a moment generator for receiving said absolute values and for determining a moment thereof with respect to a reference point of the window, and for generating an output signal when a predetermined minimum value of said moment is reached in order to indicate that a local high value is reached of the value of said coordinate-wise gradient as averaged over the local pattern, a connection being provided for supplying said output signal as an activation signal to said difference determining device, there also being provided a cycle generator for presenting the respective stored data from the second storage means to the difference determining device, said "correspondence" signal acting as a first stop signal for signalling a recognition, a "non-correspondence" signal acting as a proceed signal for presenting further patterns stored in the second storage means for comparison until all patterns have been presented, a second stop signal acting to unblock a blocking element between an output of the first storage means and an input of the second storage means in order to store the pattern stored in the first storage means at a vacant storage location in said second storage means. The images stored can be presented for comparison either simultaneously, in different comparison elements, or successively. The result may be that the unknown sub-pattern is identified by one of the sub-patterns stored, in which case said first stop signal may imply an activation signal for the stepping mechanism. It may also be that said first stop signal activates only a bookeeping mechanism in order to record which local patterns have produced a correspondence: the stepping mechanism is then always activated by the second stop signal. However, if the local pattern cannot be recognized, the non-recognized pattern can automatically be stored as a "new" reference pattern. Preferably, such a learning phase and recognition phase for the local patterns occur simultaneously, because it may not be known in advance how many different local patterns will be present. The device in accordance with the foregoing thus has a certain self-organizing capacity. Moreover, the newly presented pattern can be derived from the pick-up means (for example, in that the window device is embodied in the pick-up camera). On the other hand, the first storage means may also be embodied in a specific memory, for example, a shift register.

Preferably, a second window device is connected to a data connection of the second storage means in order to limit activated supply of data to the difference determining device to coordinate positions of a pattern to be stored in said second storage means for which either a predetermined coordinate-wise gradient of said signal value is detected or for which a predetermined coordinate-wise gradient of said signal value is detected at a neighbouring coordinate position. In a two-dimensional binary image such a sub-pattern for which even a neighbouring coordinate position does not exhibit a gradient is formed by a uniform part (black or white) which does not contain information as regards the geometry of the image. If the second window device is connected to the data input of the second storage means, such gradient-free parts of the patterns are stored as indifferent (don't care) information and are not taken into account for the later comparison: a combination of a don't care information and any other information will never produce a difference signal. The comparison with patterns to be recognized later is then better defined because, for example, signal noise in an otherwise gradient-free pattern part will not influence the comparison result. However, if the second window device is connected to the data output of the second storage means, such gradient-free parts are stored, but are not taken into account for the comparison at a later stage. In the latter case a somewhat smaller storage capacity suffices. The two window devices thus cooperate closely: the first device determines the location and the second device determines therein the magnitude of the sub-pattern to be compared. A typical case of disturbances at the edge of the image is formed by neighbouring objects which may be more or less far removed.

Preferably, there is provided a feedback connection between an output of the moment generator and an activation input of the stepping mechanism in order to supply the stepping mechanism with a step direction signal, fourth storage means being provided for the intermediate storage, after all patterns stored in the second storage means have been presented, of a reference position of the window device then prevailing, there being provided a repetition device for generating at least one additional starting position, and there also being provided a comparison element for comparing, after the minimum value of said moment has subsequently been reached again, the reference position of the window device then prevailing with that stored in the fourth storage means, and for forming a running total of correspondences and for ultimately generating said second stop signal after a predetermined minimum total has been reached, starting from said at least one additional starting position.

Sometimes a local maximum value in the gradient of the signal value will offer only a very small interception area for the window device: only a very specific starting position then produces the stable or even don't care equilibrium. In that case such a local pattern is not very significant, so that it is not stored as a reference pattern. The additional starting positions can be formed in various ways: they may be "normal" starting positions which therefore produce a new reference pattern only if this pattern is reached from at least two "normal" starting positions. Alternatively, they may be one or more additional positions which are positioned at a given coordinate difference from the focussing point reached.

On the other hand, preferably there are provided fifth storage means for storing under the control of said second stop signal, a provisionality flag signal and for forming a running total, there being provided a repetition device for generating at least one additional starting position and for incrementing the running total by a subsequent first stop signal for the pattern most recently stored in the second storage means in order to reset, starting from said at least one additional starting position, said provisionality flag signal only when a predetermined minimum running total is reached, but to invalidate the latter pattern, otherwise. In one direction the stability of the focussing may be indifferent. This is the case, for example, for a straight boundary. If the same pattern is then found slightly further, it is still a relevant pattern.

The foregoing indicates that not all sub-patterns are equally useful for storage as a reference pattern. The usefulness notably depends on the further use of the stored recognition results. For example, it may be that an overall pattern comprises a given number of recognized sub-patterns and also one or more irrecognizable sub-patterns. Often it may still be recognizable on the basis of a comparatively limited number of recognized sub-patterns. This case can occur when products are to be recognized which, however, are overlapped by other products (for example, punched plates). The sub-patterns formed by the overlapping are irrelevant for the recognition. Furthermore, the references stored in the second storage means are preferably invariable as regards the scale value of the coordinate positions. For image scanning, the size of the image (for example, given by the distance between object and scanning member) is not known per se. Therefore, an additional requirement can be imposed on the reference pattern stored in that the pattern should exhibit at the most a predetermined variation of said coordinate value.

BRIEF DESCRIPTION OF THE FIGURES

The invention will be described hereinafter with reference to some Figures.

DESCRIPTION OF A PREFERRED EMBODIMENT

It has already been stated that the invention can be used for a variety of patterns of digital signals. For the sake of simplicity, the following description is devoted to two-dimensional images of binary data: black and white, respectively. Therefore, there are two independent coordinates which may be referred to as "x" and "y".

Figure 1:
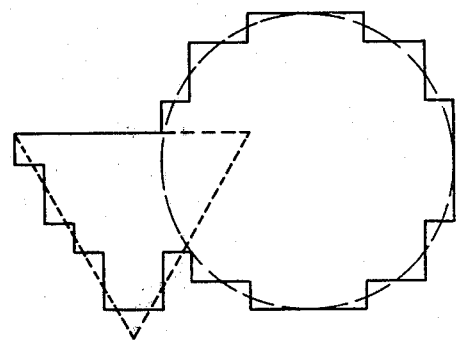
FIG. 1 shows first patterns of digital signals.

FIG. 1 shows the original version of such a two-dimensional image in interrupted lines and the binarized version thereof in non-interrupted lines. The desired recognition may be the finding back of the location and the number of the constituent figures which may be in a rotated and/or overlapping position. Relevant sub-patterns (local images) are, for example, the upper edge, the lower edge, the left edge and the right edge for the circle. Relevant sub-patterns for the triangle are, for example, the three corners; the latter are not influenced by the scale of the triangle.

Figure 2:
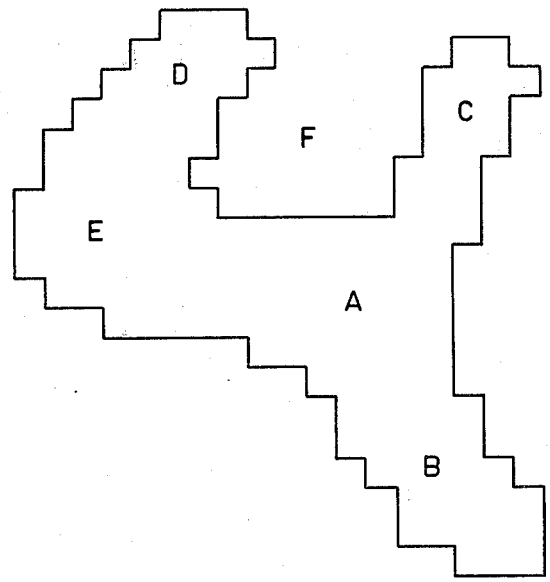
FIG. 2 shows second patterns of digital signals.

FIG. 2 similarly shows a binarised character "4". Relevant sub-images are denoted by the letters A-F. The character can be recognised when an adequate number of sub-images have been recognised in an acceptable position with respect to each other. If some characters exhibit much variation, a comparatively large number of sub-images thereof will be stored.

Thus, the capacity of said second storage means is properly used. It is to be noted that such characters may have been prepared, for example, by skeletonizing or smoothing of the edges in order to make said sub-images more characteristic or less susceptible to noise phenomena.

Figure 3:
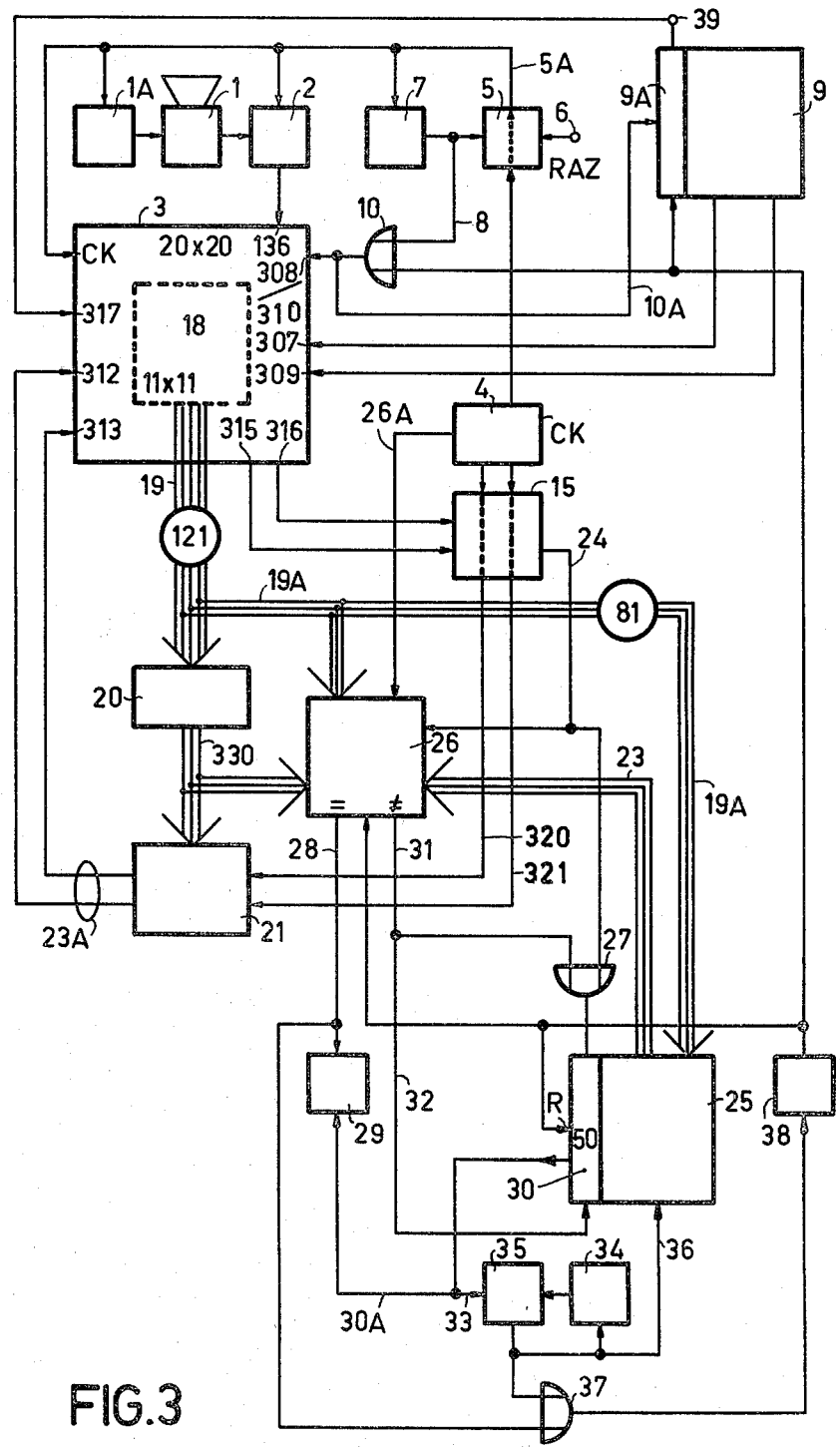
FIG. 3 shows a block diagram of a device in accordance with the invention.

FIG. 3 shows a block diagram of a device in accordance with the invention which is notably intended for two-dimensional images. Pick-up device 1 is a known raster scanning device which scans the presented images under synchronizing control by the clock pulses on line 5A. Element 1A is the generator for the actual scan and comprises in known manner an x-counter, a y-counter and a generator for the starting point of the scan (i.e. two preset coordinates which may be stored in as many registers). The image is converted into a bit stream in a preamplifier/limiter 2, synchronized by the clock pulses on the line 5A. In this example, the image comprises an array of 20×20 pixels; this array may be, for example, a part of the complete image presented for analysis which may have the extent of, for example, a television image. The information of said 400 pixels is applied to element 3 which is constructed as a two-dimensional shift register (see also FIG. 4a). Storage is controlled by the clock pulses on the line 5A which (see FIG. 4b) are transmitted by control unit 5 via AND-gate 162 if data flipflop 160 is in the "1"-position. The positive-going edges of the clock pulses on input 163 control the elements 1, 2, 3. The flipflop 160 assumes the "1"-position under the control of a reset signal RAZ on terminal 6 which cooperates with the clock pulse inverted via inverter 161. Via OR-gate 165, the flipflop 160 is subsequently maintained in the "1"-position. Therefore, the signal RAZ must be present for at least one clock pulse period. Alternatively, it may be a manual signal. If desired the output of the OR-gate 165 may incorporate a facility against jittering. Element 7 also receives the clock pulses of the clock 5 and counts the positive-going edges thereof. In the position "400", the element 7 supplies an output carry signal on line 8. The element 7 can then assume the zero position. A further possibility exists in that it is reset to zero under co-control by the signal RAZ. The signal on the line 8 acts as a reset signal (terminal 164) for the flipflop 160 which has priority over the output signal of the OR-gate 165. As long as the signal RAZ remains absent, the flipflop remains in the zero position, so that the pick-up phase has ceased.

Figure 4A:
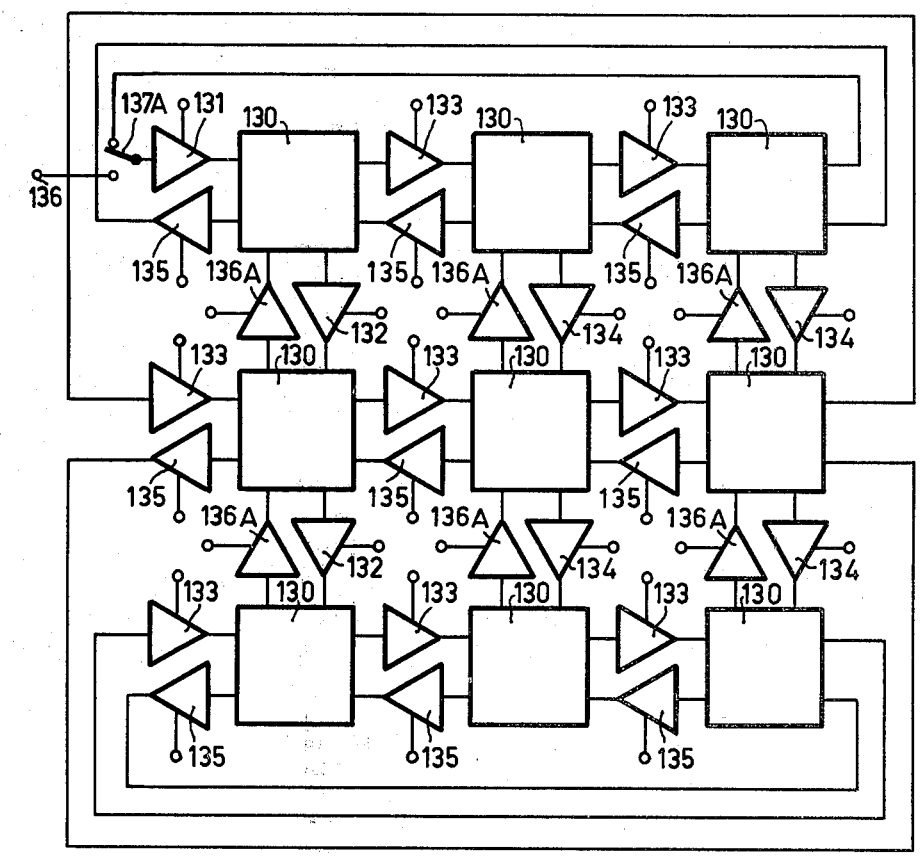
FIGS. 4a-4k show details relating to FIG. 3.
Figure 4B:
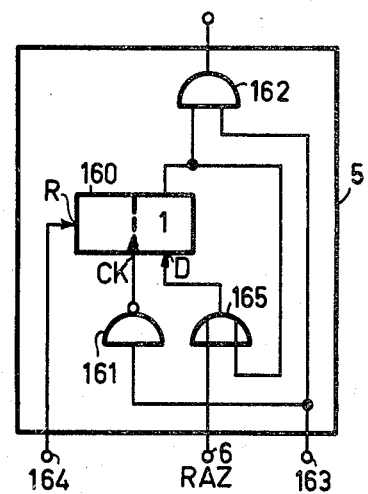

In this respect, FIG. 4a shows a two-dimensional shift register of 3×3 positions. Each stage 130 contains one bit of information or, on the other hand, as much information as is generated for each image position by the device 2. The shift register stages are activated together by way of clock pulses (not shown) for the supply or storage of data. This is possible in that each stage comprises a master-and-slave flipflop. The use of a two-dimensional shift register in the field of pattern recognition is known per se and is described, for example, in the book by J. R. Ullmann, Pattern Recognition Techniques, London 1973, notably on pages 34-37. In a given embodiment, during the pick-up a selector switch 137A is set to its lower position and gating elements 131, 132 are activated until the first column has been filled after three clock pulses. In reaction to the fourth clock pulse, gating elements 131, 133 are activated and the information already stored is shifted one column further. Subsequently, two clock pulses appear with activation of the gating elements 131, 132, one clock pulse with activation of the gating elements 131, 133, two clock pulses with activation of the gating elements 131, 132, after which nine bits have been stored and the switch 137A is set to its upper position. For a larger shift register, the organization is similar. The data of the scanner is received on input 136. Each of the stages 130 comprises one data input which is connected to four gating elements and one data output which is connected to four further gating elements. The control sequence of the gating elements is controlled by a counter 300 in FIG. 4c which receives the storage clock pulse and whose position is decoded in order to activate the correct gating elements. For more grey levels or colour levels, the stages 130 comprise an adequate number of parallel-connected bit storage elements.

Figure 4C:
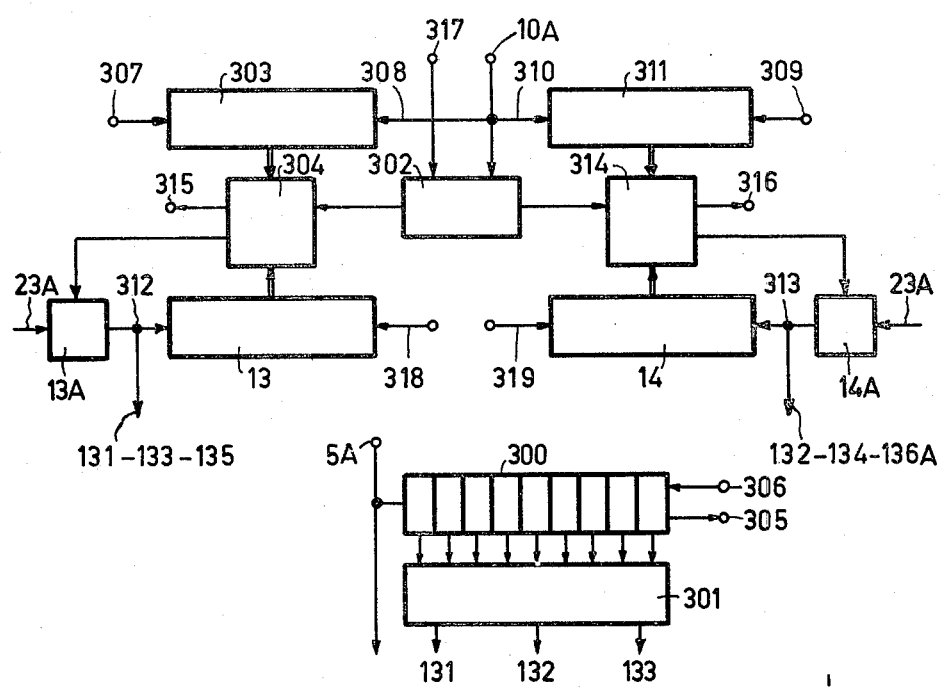

FIG. 4c illustrates the control of the two-dimensional shift register 3. Counter 300 receives the clock pulses on the line 5A: for a 20×20 points shift register, this counter comprises 400 positions, like the counter 7. Decoder 301 decodes the positions of this counter and selectively supplies activation control signals for the gating elements 131, 132, 133 on the correspondingly denoted outputs. Steps which are known per se are taken to ensure that the signal status on the outputs of the decoder 301 remains unchanged during the activation of the shift register stages by a clock pulse on the line 5A. The counter 300 may also comprise an output 305 for an output carry signal and an input 306 for resetting the counter to the zero position at the beginning of writing (for example, by the signal RAZ). The latter two signals then operate the switch 137A. The control of the shift register 3 furthermore comprises an internal clock 302, the frequency of which is adapted to the highest shifting rate in the register 3. Therefore, this frequency should at least be high enough for the writing rate, but the data processing rate (see later) may be much lower. Furthermore, there is provided an x-address register 303 with a data input 307 and a load control input 308. There is also provided a y-address register 311 with a data input 309 and a load control input 310. Also present is a bidirectional x-address counter 13 and a corresponding y-address counter 14 with counting inputs 312 and 313, respectively (the latter inputs originate from the relevant selectors 13 and 14A, the inputs of which are of a double type for internal as well as external activation). The positions of the x-address counter 13 and the x-address register 303 are compared in comparison element 304 which receives an activating clock signal from the clock 302. Similarly, a comparison element 314 is provided for comparing the y-positions of the y-address register 311 and the y-address counter, said elements also receiving an activating clock signal from the clock 302. The clock 302 is started by a load control signal on the inputs 308/310. The elements 304, 314 are subsequently alternately activated and supply a "larger than"/"correspondence"/"smaller than" signal when activated. When the correspondence signal appears, nothing further happens. If the "larger than" or "smaller than" signal appears, the relevant address counter receives a counting pulse of the correct polarity (or possibly a two-bit signal, a counting bit and a direction bit) and the x-gating elements 131, 133 or 135 are suitably activated by the comparison element 304, or the y-gating elements 132, 134 or 136A are suitably activated by the comparison elements 314, so that subsequently the image stored has been shifted over one step. The "correspondence" signals of the elements 304, 314 appear on the outputs 315, 316. When the clock 302 is deactivated by a signal on the input 317, the comparison elements 304, 314 stop the supply of signals. The counters 13, 14 can be reset to zero by a suitable signal (for example, the signal RAZ) on the relevant inputs 318, 319, said signal also being capable of setting the selectors 13A, 14A to the position for conducting the output signals of the elements 304, 314 (the control input of the elements 13A, 14A has been omitted).

The signal on line 8 in FIG. 3 activates a read cycle in the memory 9 via OR-gate 10. The element 9 may be a read-only memory (ROM or PROM); thus, a first address is read: in each address position the memory 9 contains the address data of a so-called initial focussing point. These initial focussing points are used for starting further processing. The pixels (and hence also the data in the shift register) form a two-dimensional array according to [1:20, 1:20]. The initial focussing points form a coarser array, for example according to [3, 3; 3,8;3, 13; 3,18; 8,3; 8,8 ... 18,18]. The words read from the memory 9 form the x and y coordinates of the two-dimensional shift register 3. Thus, via a window the data stored therein become available for processing. As has already been explained, the adjustment of the shift register to an initial focussing point is internally realized by the elements shown in FIG. 4c.

The shift register 3 is adapted so that no information is lost during shifting; this is achieved by the master-slave organisation for the stages 130 and because the outputs of the outer rows of the register are coupled end-around. The data of a given part of the elements of the shift register is available for further processing via outputs of the shift register stages (not shown). The arrangement of these outputs constitutes a so-called "window" on the image. For shifting this window in the negative x direction, the data is shifted in the positive x direction. In FIG. 4a this is realized in that all stages receive a shift pulse and the gating elements 131 and 133 are activated. The data of the extreme right column is then stored again in the extreme left column in that the switch 137A then occupies the upper position. For shifting the window in the positive x-direction, the gating elements 135 are activated and the data of the extrme left column is stored again in the extreme right column. Similarly, there is an end-around coupling (not shown) for two-way traffic between the lower row and the upper row of the shift register. Activation of the gating elements 134 enables shifting of the data in the negative y direction; activation of the gating elements 136A enables shifting in the positive y direction. The shift register can furthermore comprise a number of additional rows/columns which are not filled when the data is stored. As a result, for example, interaction between the data of the upper edge of the image and that of the lower edge of the image is avoided. These additional positions are also incorporated in the end-around coupling system, but remain vacant when the shift register is filled with a newer image, for example, in that the input 136 is not connected to a "edge" stage. The actual (gross) capacity of the shift register 3 may be, for example, 26×26 points. A completely different solution for the storage of the image involves a random access read/write memory wherefrom a series of words (lines or columns of the image) can be derived for further processing. The elements 13 and 14 thus indicate the position of the image in the shift register, for example, in that they count according to a Gray-type code. If a "correspondence" signal appears on both outputs 315, 316, the window has been adjusted to the initial focussing point read from the memory 9. For example, the data of a square of 11×11 points within the shift register is then available for further evaluation. The window is indicated by an interrupted line (18) and is formed in that only the data outputs of the relevant stages are connected to further parts of the circuit. The relevant 121 output lines together form the bundle 19. The bundle is connected to the device 20 for determining the coordinate-wise gradient for the 9×9 central positions of the window. In this respect, reference is made to FIG. 4d.

Figures 4D, 4F:
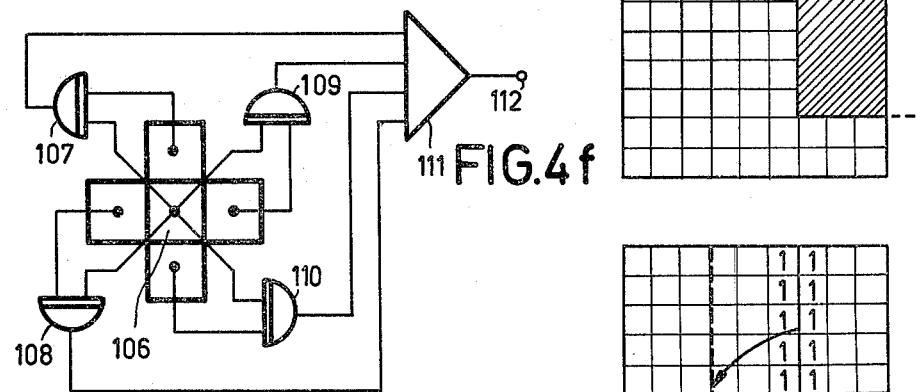
Figure 4G:
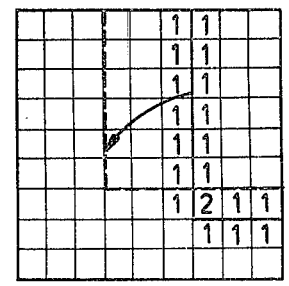
Figure 4E:
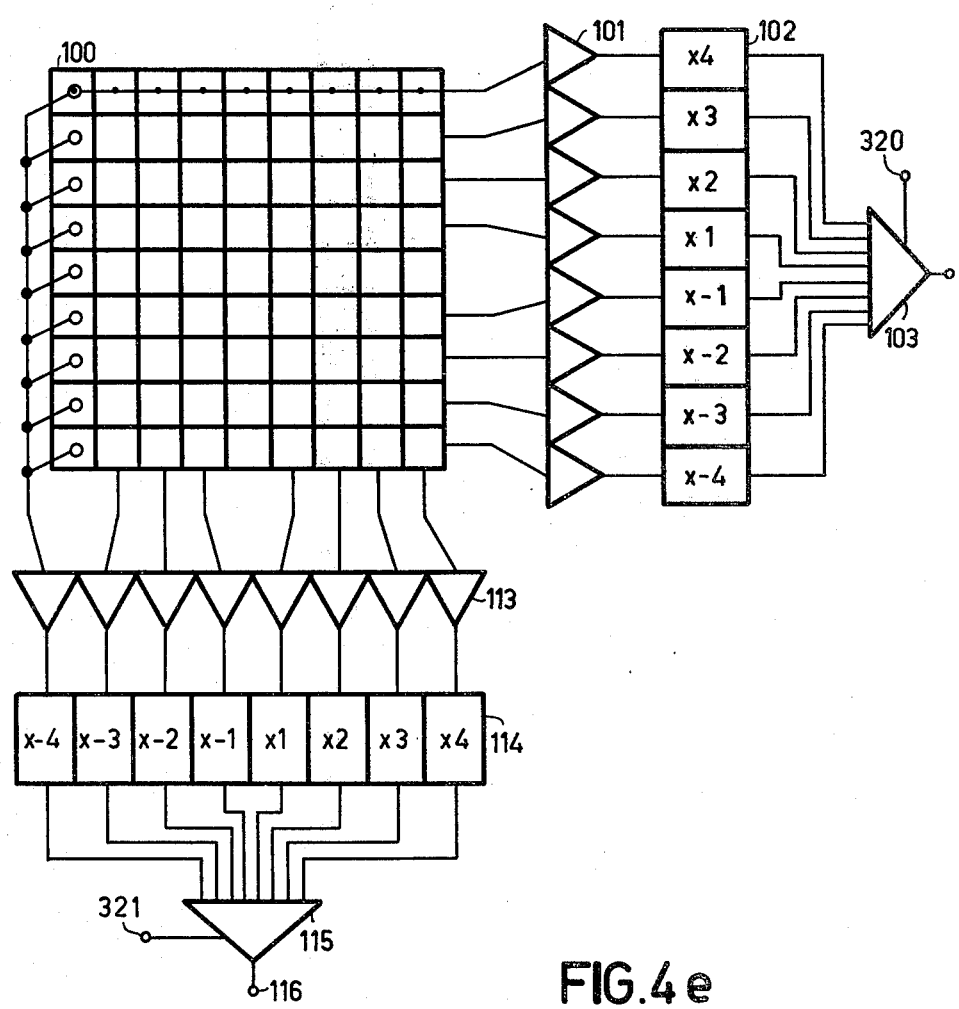

FIG. 4d shows a relevant circuit for one of the 9×9 window points. Element 106 symbolizes the central point and its four immediate neighbours. The data thereof is selectively applied in the described manner to the four EXCLUSIVE-OR-gates 107–110. Thus, these gates supply a "1" if the data received does not correspond; otherwise they supply a "0". The output signals are added in the summing device 111 and the sum is available for further use on terminal 112. The value range of this sum is the closed interval [0,4]. In another embodiment, the algorithm for determining the gradient may be different, for example, in that the central point is compared, by way of eight EXCLUSIVE-OR-gates, with its eight neighbours (according to a 3×3 matrix). If grey levels are concerned, the elements 107–110 could be differential amplifiers supplying the absolute value of the difference. A further method of determining a gradient is the determination of the difference between the most extreme intensity values among the neighbouring points. The gradient data of a window of 9×9 points is applied from the unit 20, via line 330, to the unit 21; a diagram thereof is shown in FIG. 4e. The 9×9 points are symbolized in the square 100. The gradient values for the upper nine window points are summed in the summing amplifier 101. The element 102 multiplies the value received by a fixed factor four (this factor may also be permanently incorporated in the element 101). The output signal is applied to the summing device 103. Similarly, the signals of the other rows are processed, be it that the multiplication factors initially decrease in the downward direction and subsequently increase again with a negative sign. The middle row is not taken into account in this respect: the multiplication factor is zero. The central window output is the focussing point.

The outsignal on the output of the summing device 103 may be positive, negative or zero (in the closed interval [−360, +360]; the highest value is reached if one half of the image concerns a checkerboard pattern). The result equals the product of the sum of the gradients and the moment (in the y direction) of the absolute value of the gradient around the horizontal symmetry axis and with respect to the focussing point (original centre of the window). Implicitly, the moment can thus also be found and it can be found back, if desired, by means of conventional dividing circuits (not elaborated herein). It is assumed in the foregoing that the edge of the image of 20×20 points does not make a contribution to the gradient. There are several solutions to this problem. A first solution consists in that shifting ceases before the edge is reached. To this end, the number of initial focussing points can be situated in only a small central region of the 20×20 point sub-image. A suitable number in this respect is four initial focussing points at the positions: (8,8), (8,13), (13,8) and (13,13); an upper limit should also be imposed as regards the number of permissible shifts per initial focussing point. Another possibility consist in that the image consists of "black" elements on a "white" background, the additional shift register locations (see above) also being considered as "white". There is a further possibility in that the additional shift register locations are originally filled with "don't care" data which never produces a signal on the output of the EXCLUSIVE-OR gate.

If said moment is positive, the upper half of the window contains more gradient, so that the window must be shifted upwards. If the number is negative, the window must be shifted downwards. If the number is zero (or at least smaller than a predetermined value), the window may remain (possibly for the time being) at the same level. FIGS. 4f, 4g illustrate the focussing to the projecting corner of a black (shaded) part of an image. FIG. 4g shows the relevant gradient values, the values zero having been omitted. The result of the summing device 103 is in the case $8+6+4+2-2-10-9=-1$. This is optimum focussing. Similarly, a column-wise sum of the gradients is determined in the elements 113–115. If the sum is positive, the window must be shifted to the right. If this sum is negative, the window must be shifted to the left. In this situation, the sum is $8+6+18+7=39$. When the window is shifted one location to the right, the sums formed are:

|                        | 103: −6  | 115: +27 |
|------------------------|----------|----------|
| To the right once more: | 103: −11 | 115: +13 |
| To the right once more: | 103: −16 | 115: −3  |
| Downwards once:        | 103:0    | 115:0    |

Figure 4H:
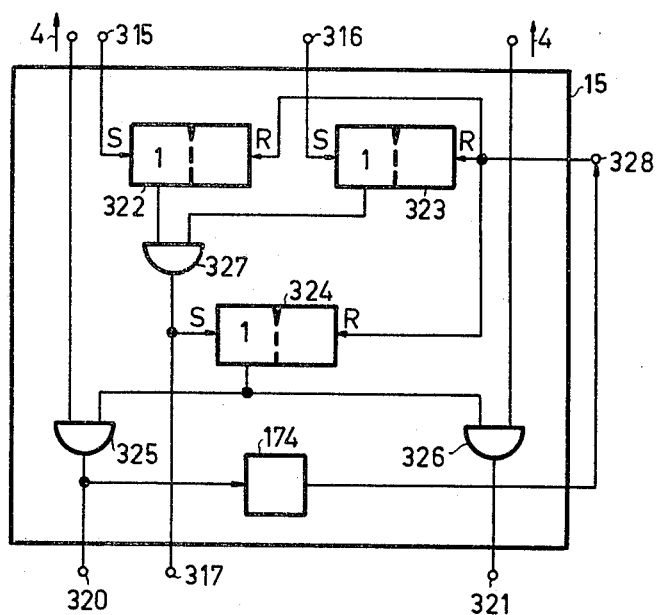

In this position, the corner is indicated by an interrupted line. Focussing is then optimum in both directions. In FIG. 3, the element 20 determines the local gradient for the 9×9 window points and contains, for example, 81 times the circuit shown in FIG. 4d which then acts on the data of a block of 11×11=121 points of the shift register 3. The element 21 receives the 81 data formed, for example, as a 3-bit code and comprises the components of FIG. 4e. The output signals of the elements 103, 115 are rendered trivalent by a three-value generator (not shown). For each of the two coordinate directions, the three-value generator consists of two threshold elements which supply, for example, a signal "1" if the moment is larger than +4 or smaller than −4, respectively. Thus, when the sum is in the interval [−4, +4], the two-bit output signal is (0,0) for the relevant coordinate direction. Each of the elements 103, 115 also receives an activating clock pulse from the clock 4 along the lines 320 and 321, respectively. These pulses have, for example, a clock frequency which is lower (for example, 10 times lower) than that of the clock pulses of the line 5A, because the elements 20, 21 require some time for signal processing. These clock pulses are conducted by the element 15 (see FIG. 4h). The element 15 receives the signals from the terminals 315 and 316. These signals set the relevant flipflops 322 and 323 to the "1" position. If both flipflops supply a logic "1", AND-gate 327, having a differentiating output, supplies a logic "1" pulse in order to set the gating flipflop 324 to the "1" position, so that AND gates 325, 326 are unblocked for said alternating clock pulse series. A further solution consists in that each of the signals on the lines 315, 316 activates a monostable multivibrator. These multivibrators have an astable period which is slightly larger than half the period between two successive clock pulses for the elements 304, 314. The outputs of these monostable multivibrators activate gate 327, so that the flipflops 322, 323 may be omitted. In the circuit shown, the flipflops 322, 323, 324 are set to zero by a pulse on input 328. The output pulse of gate 327 can be used for deactivating the clock 302 via the input 317 and for making the selectors 13A, 14A conductive for the signals on the line 23A. These selectors have been omitted in FIG. 3 for the sake of brevity. Both two-bit output signals of the element 21 activate, via the lines 23A, the address counters 13, 14 in the same way as the output signals of the comparison elements 304, 314. In the present embodiment the window is focussed if the absolute value of the two moments is smaller than five. When the window is focussed, but this need not take place immediately, the flipflops of the element 15 can be set to the blocking position (0) again via line 328. In the present embodiment, resetting is realized in that the pulses conducted by gate 325 are divided by six in a divider 174: this offers the advantage that during the focussing, the window does not "drift" so far that other initial reference points are passed. (Obviously, a number other than six may be selected). The output signal of the divider 174 appears on the terminal 328 and can also be used for indicating the termination of focussing.

Figure 4I:
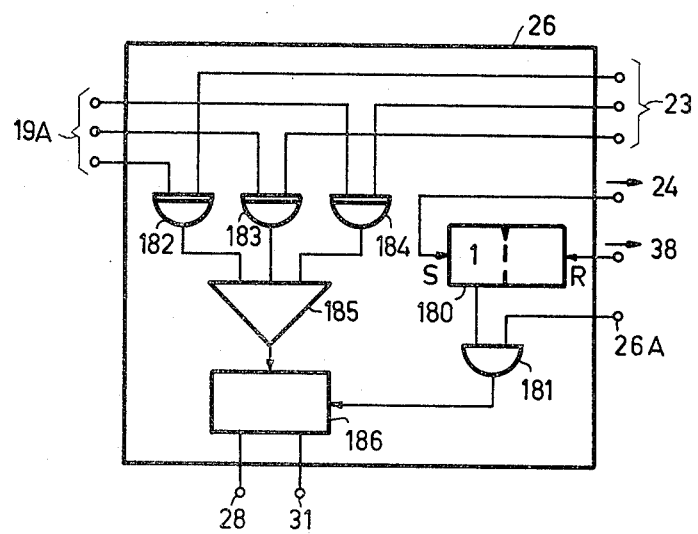

The latter signal (on the line 24 in FIG. 3) activates a comparison cycle, first of all by a read control signal via the OR-gate 27, so that the address 0 in the memory 25 is read. The memory 25 comprises a number of address locations. In each location a local reference pattern can be stored. The signal on the line 24 furthermore activates the comparison element 26 by setting (FIG. 4i) the flipflop 180 therein. Via a branch 19A of the bundle 19, the element 26 receives the data of the 9×9 central window points. When activated, it supplies, co-controlled by a signal from the clock 4, a bivalent signal: "correspondence" or "non-correspondence". In a simple embodiment, the bivalent data of a window point is each time compared with data which is read from the memory 25 and which is applied to the comparison device 26 via the data line 23. The device 26 can comprise an EXCLUSIVE-OR gate per window point (for the sake of simplicity, FIG. 4i shows only three such gates (182–184)); these gates perform the comparison and their output signals are applied to a summing device 185. The output signal thereof is treated in a discriminator circuit 186. This circuit is activated by a clock pulse via the AND-gate 181.

Figure 4J:
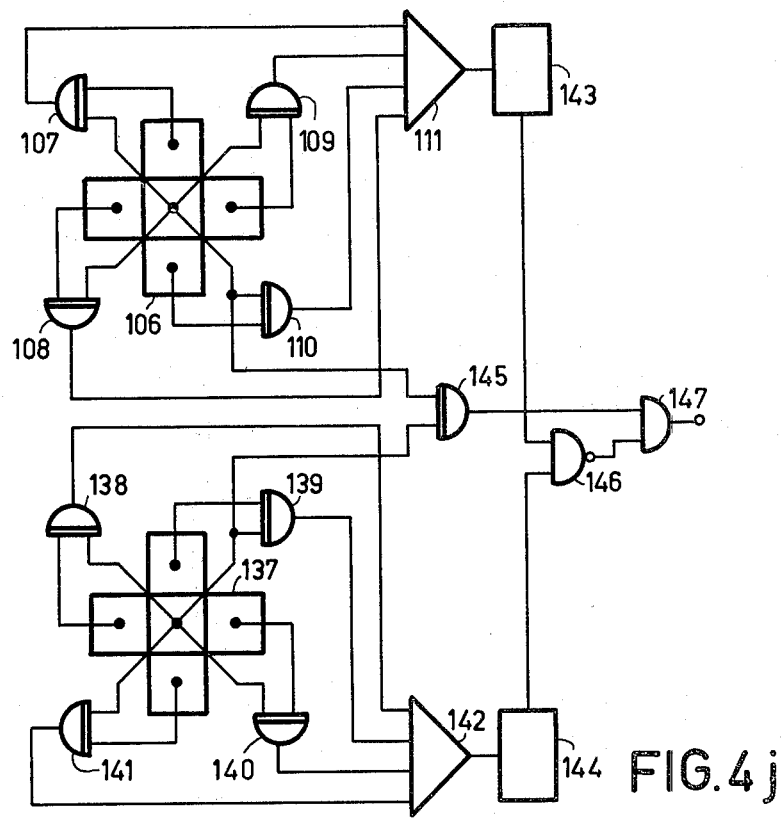
Figure 5A:
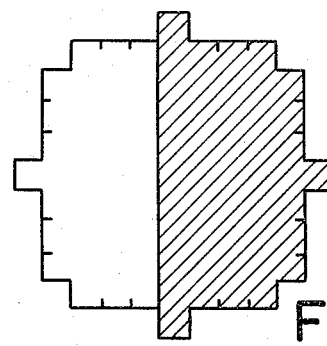
FIGS. 5a-5d show some images in support of comparison rules.
Figure 5B:
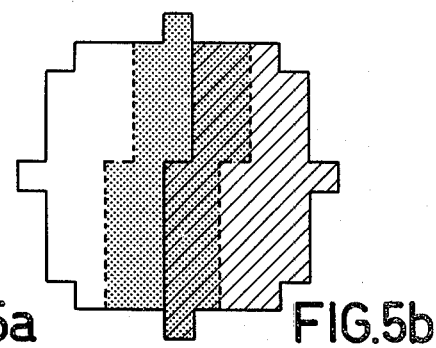
Figure 5C:
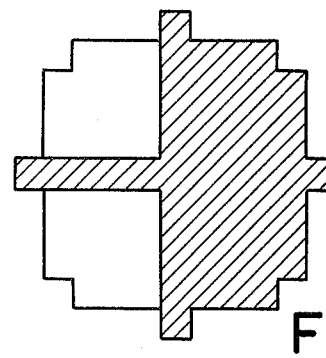

In this respect FIG. 4j shows, in combination with FIGS. 5a–c, a further elaboration of the treatment in the element 26. First of all, the Figure shows the elements 106-111 of FIG. 4d, which may thus be the components of the element 20 in FIG. 3. Therefore, on the output of the element 111 a gradient value appears which can also be applied, via line bundle 330, to the element 26. Per image point the value range is in the closed interval [0,4]. Furthermore, there is provided a parallel arrangement where an element 137 contains the symbolized data values of five corresponding reference points stored in the memory 25. The gradient value thereof is also determined by way of four EXCLUSIVE-OR gates 138-141 and a summing device 142. Elements 143 and 144 form a binary signal from the signals received; the significance of this binary signal is, therefore: gradient $=0$, or $\neq 0$. Element 145 is an EXCLUSIVE-OR gate which compares the data of the two "central" points and which supplies a "0" if these two data correspond: this gate thus corresponds to the gates 182–184 in FIG. 4i. Element 146 is a logic NAND-gate which supplies a "0" if the gradient is not equal to zero for both central points. This gate otherwise supplies a logic "1". AND-gate 147 supplies a logic "1" if the two points do not correspond and, moreover the gradient is "0" for at least one of these points. A device of this kind can be provided for each of the EXCLUSIVE-Or gates in FIG. 4i.

In the case of an image with grey values, the correspondence can be detected as follows. For the image point to be examined, the grey value thereof determines, together with the grey values of the four neighbouring points, a permissible grey interval. The same is done for the reference pattern stored. If the grey values of image point and reference point are situated in the mutually permissible grey interval, correspondence is established. In the case of a large local gradient, therefore, larger differences between the grey values of image point and reference point are thus also permissible.

FIGS. 5a-d show a different composition of the window; on the one hand, the window again comprises 81 points, but its shape approximates that of a circle. In given circumstances this shape results in a better realization. FIG. 5a shows an edge of a dark image portion. The position shown is one of the two positions in which focussing is optimum (the edge may also be shifted one column to the right). FIG. 5b shows such an edge which originates, for example, from an object which has been slightly rotated. The FIGS. 5a and 5b exhibit a difference of five points. FIG. 5c shows an edge with a projection. Focussing is not optimum in this case, because the edge should actually be situated further to the right inside the window. However, this is ignored herein. The difference again amounts to five points. The device shown in FIG. 4j calculates the difference between the FIGS. 5a and b to be 0 and that between FIGS. 5a and 5c to be four. The device is thus insusceptible to small shifts in the image. The foregoing justifies the use of the complex device shown in FIG. 4j rather than the EXCLUSIVE-OR gates of FIG. 4i and of the correspondingly more complex approach in the case of a larger number of grey values.

If the comparison in the element 26 results in an output signal of the summing device 185 (which may receive the signals from EXCLUSIVE-OR gates 182-184 or also from the AND-gates 147 in FIG. 4j) which exceeds a minimum value, this signal is converted into a "non-correspondence" bit. The device 26 can receive the 9×9 centrally situated window points or a different selection as described with reference to FIG. 5a. Co-controlled by a clock signal (again having a comparatively low clock frequency) via gate 181, the "correspondence" signal appears on line 28 in the case of correspondence and activates the updating device 29. In a simple embodiment, this device is a memory in which there are as many address locations as in the memory 25. The signal on the line 28 then acts to control a read modification write cycle during which the memory 29 is addressed by the address register 30 of the memory 25 via the line 30A, the modification of the addressed memory location being an incrementation by "1". Thus, a list of the recognition of sub-images is built-up in the memory 29. From this list further conclusions as regards the complete image can be derived in a next step. This next step is beyond the scope of the present invention, so it will not be elaborated herein. Said recognition can terminate the cycle as a first stop signal and can activate a next reference point. A further possibility consists in that the recognition produces a flag signal in a hold element which is connected parallel to the memory 29, said flag signal blocking later storage of the local pattern as a "new" pattern in the memory 25. Similarly, the signal "non-correspondence" appears on the line 31 and activates the memory 25 via the OR-gate 27 again in order to reach the next pattern. Via a signal on the line 32, the adddress register is then incremented by one unit. Via the line 33, the address from the address register 30 is applied to the comparison element 25. This element furthermore receives the position of the counter 34. This position is higher by one than the highest occupied address. If non-correspondence is detected, the comparison device 35 does not supply a signal, because the memory 25 must then be further interrogated. Detection of correspondence means that all occupied address locations in the memory 25 have been presented for comparison, without generation of a correspondence. In a simple embodiment, this correspondence signal can act as a second stop signal, so that subsequently a new initial focussing point is activated. In a self-organizing version this "correspondence" signal acts as a write control signal on the line 36. This signal controls a write operation at the next-higher address in the memory 25, the information on the line 19A then acting as data to be stored. The write operation can take place, for example on the leading edge of the pulse-like signal on the line 36. The trailing edge of this signal then controls an incrementation of the counter 34. Simultaneously with the writing of the new pattern in the memory 25, said write operation in the memory 29 can also take place. This is not shown for the sake of brevity. The "correspondence" signal on the line 28 and the incrementation signal on the line 36 are combined in the OR-gate 37. In the case of said flag signal (stored in a hold element), the OR-gate 37 is omitted, but the line 36 originates only from a blocking gate which is controlled by the element 35 and a blocking signal from said hold element. After a brief delay, said hold element receives a reset signal again. The element 38 is always directly activated by the comparison device 35. The element 38 delays a signal received by a brief period of time. Subsequently, it is applied to the comparison element 26 in order to deactivate this element by the resetting of the flipflop 180, so that the AND-gate 181 is blocked. Furthermore, the signal of the element 38 is applied to the (counting) address register 30 in order to reset this register to the zero position. Finally, the signal of the element 38 is applied to the adddress register 9A of the memory 9 in order to increment this register by one unit, and to the OR-gate 10 in order to initiate a read operation at the incremented address. Furthermore, the signal of the gate 10 is applied to the load inputs of the registers 303, 311 and to the activation input of the clock 302. Thus, a new comparison operation is started. When the address counter of the memory 9 reaches a predetermined position, the signal "ready" appears on the output 39. This signal can be used for starting the writing of a new image (i.e. as the signal RAZ, for which a new starting value must be applied to the element 1A), for rewriting an image which changes in the time, or as a signal to a user (operator). If necessary, this signal also deactivates the clock 302 via the line 317. For this purpose, the signal of the terminal 39 can be combined, via an OR-gate (not shown), with the output signal of the element 15.

In the foregoing, there was a close relationship between the memories 25 and 29. Hereinafter, a more complex set-up is described. In the case of non-recognition the procedure is as described above. When correspondence occurs, the memory 29 receives, via the line 30A, the address in the memory 25 (so that the reference is known). Moreover, the memory 29 receives, via a branch of the address counters 13, 14 (not shown), the content thereof, while the signal "correspondence" on the line 28 controls a write operation, thus incrementing the adddress register by one unit. Thus, an overall image can be recognized if an adequate number of details thereof are detected at mutually related positions. On the basis of two or more details of a workpiece, the orientation and position thereof can be determined, even if a mixed range of different workpieces is presented. The control of a tooling machine by means of a recognized workpiece detail is known per se from the previous U.S. Patent Application Ser. No. 618,031 (PHB 32,467C) in the name of Applicant, but therein only a single image detail is concerned. When all initial focussing points have been treated, the memory 29 then contains, for all reference data stored in the memory 25, a listing whether or not the references have been recognized and where they have been recognized (in that case, the overall image may not contain two identical workpieces in the same orientation).

Figure 5D:
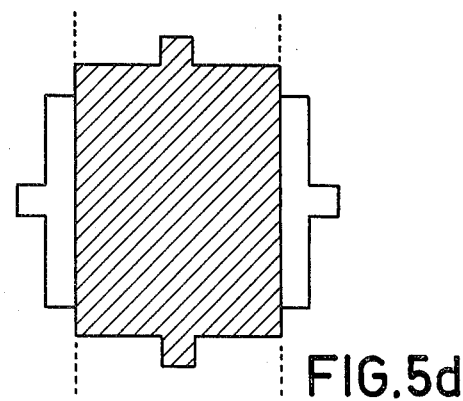

The following description is given for further illustration. FIG. 5d shows a properly focussed pattern, but this focussing is unstable: if the window is shifted one column to the right, a further shift command to the right occurs. Due to successive shifts, the window may then be focussed on the right edge of the pattern. A further requirement for a pattern to be stored may then be that the interception zone is sufficiently large, i.e. the zone wherefrom focussing on this pattern takes place. A requirement may be, for example, that the interception zone must contain at least two initial focussing points. The foregoing can be realized in that a validity bit is added only when a pattern is encountered for the second time (first time causes storage in the memory 25, second time results in recognition). A preferred possibility consists in the addition of addditional initial focussing points to a focussing point, for example, at a distance which is smaller than that between neighbouring focussing points. The focussing point is accepted only if it is found back for a minimum number of additional initial focussing points. This can be realized in two ways:

(a) the same pattern is found back, regardless of the location where it is found back. This is advantageous for the finding back of patterns having an indifferent stability (see FIG. 5d hereinafter). This means that a recognition occurs for the highest position of the address counter 50 which still indicates a filled memory location. A sum forming device is then provided whose position is incremented if recognition occurs exactly at this last adddress. Therefore, recognition occurs and also the comparison device 35 supplies a "correspondence" signal.

(b) the same focussing point is found back. In that case the position of the adddress counter 13, 14 is compared with the data of the previously found focussing point which may be stored in the memory 29 as stated above. If correspondence is present, a sume counter is again incremented. Preferably, the spacing between initial focussing points is five points in the x direction or y direction. Near a focussing point, four additional initial focussing points are then generated at distances of approximately 3 points in the x direction or y direction.

These points are formed by applying a corresponding number of stepping signals to the address counters 13, 14. If the sum is incremented each time, a relevant local pattern is concerned, which is signalled, for example, by an overflow signal from the sum counter. If this overflow signal does not occur, an irrelevant pattern is concerned. It can be invalidated by decrementing the counter 34 by one unit. In both cases element 15 produces the signal "proceed" after the focussing from the fourth additional initial focussing point. Said method substantially reduces the number of patterns stored in the memory 25. In view of the foregoing, the focussing in the y direction in FIG. 5d is indifferent. In that case the essential aspect of the generating of the additional focussing points consists in whether the same local pattern is found back, possibly in a different coordinate position.

Figure 4K:
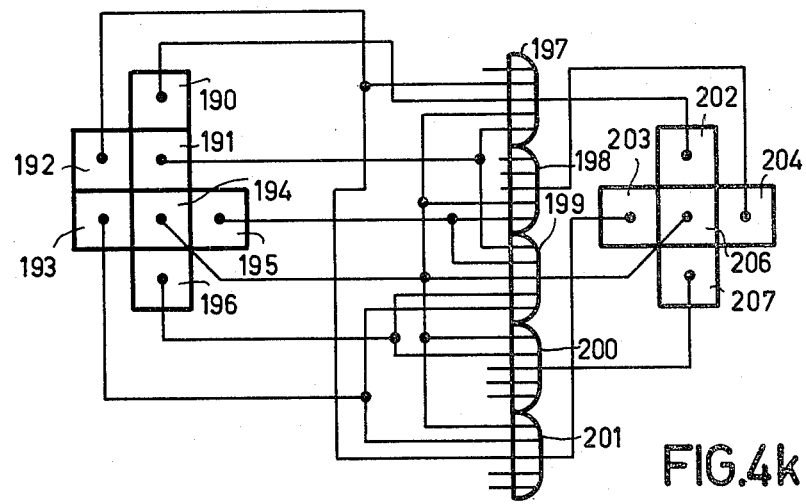

A further improvement will be described with reference to FIG. 5b and FIG. 4k. In FIG. 5b, a broken line indicates a central zone in which the actually relevant information is present: the edge and the area near the boundary between black and white. The interrupted pair of lines indicates a mask; only the intermediate area is presented for comparison at a later stage, the remainder being masked, for example, by additional data stored in the memory 25 which can indicate "don't care" each time for a point stored. Thus, a point is relevant if either a coordinate-wise gradient is present at that point, or a coordinate-wise gradient is present for one (or more) of its four immediate neighbours in the x direction and the y direction. FIG. 4k shows an arrangement 190-196 of the gradient data per point. Thus, this is the binarized output signal of the summing device 111 in FIG. 4d. The OR-gate 199 receives the data of the elements 191: 193–196 and forms the data for the central point 206: if this is a "1", the point 194 is situated within the mask. For the other points, only a part of the masking is indicated. This device may thus be connected in front of the data input of the memory 25 in order to represent per data point also a mask data: if this is a "1", it also activated the AND-gate 147 in FIG. 4j after reading, so that a difference can become apparent. If the mask data is "0", there is always correspondence. A circuit as shown in FIG. 4k can also be present in the data path between the memory 25 and the comparison device 26. A second window device is thus implemented.

Figure 6A:
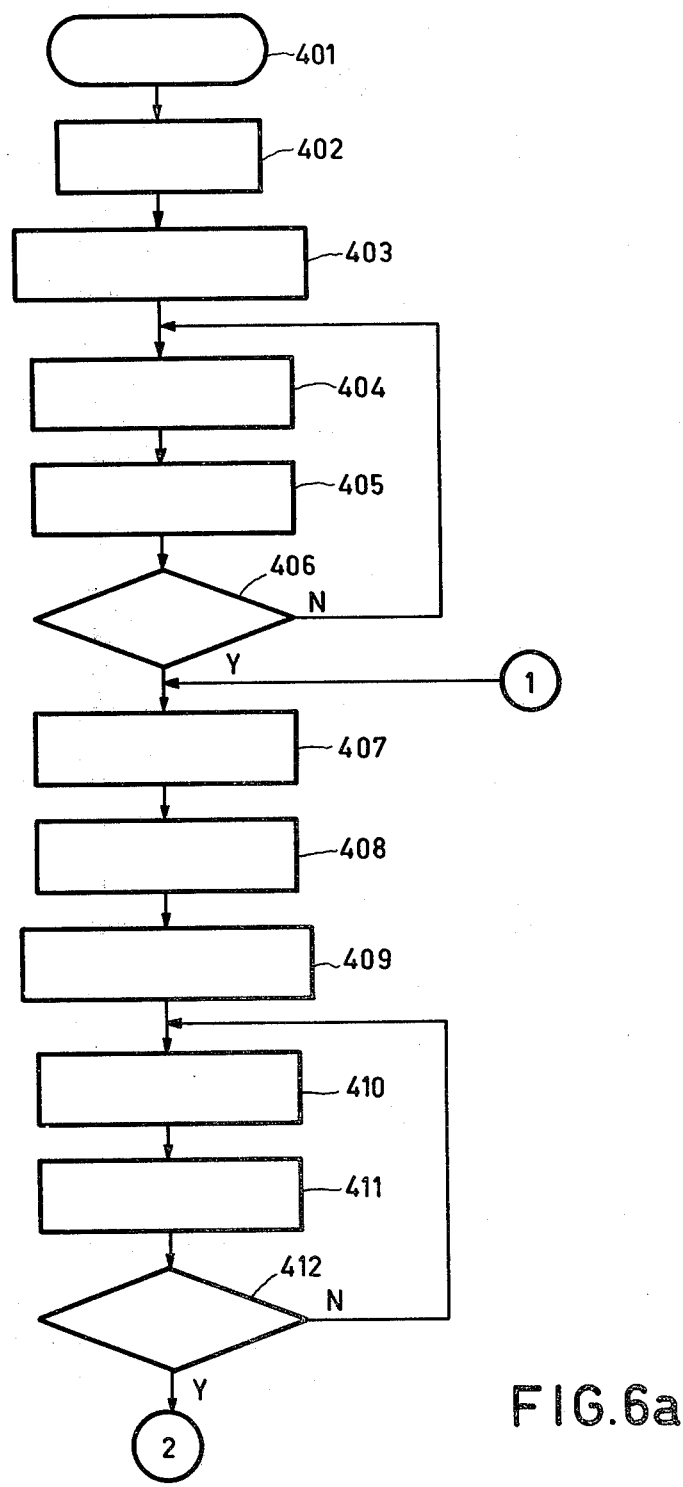
FIGS. 6a-6c show a flow diagram of the signal processing.
Figure 6B:
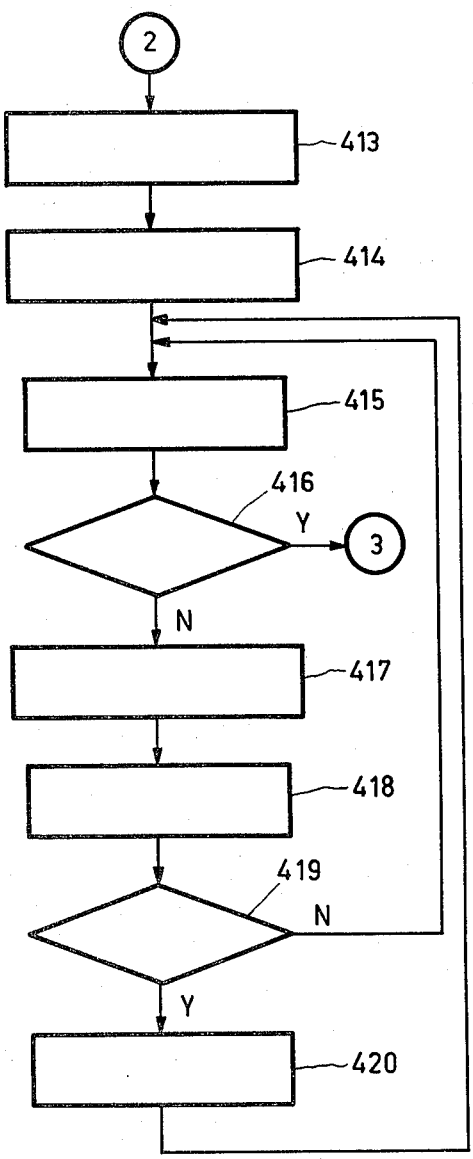
Figure 6C:
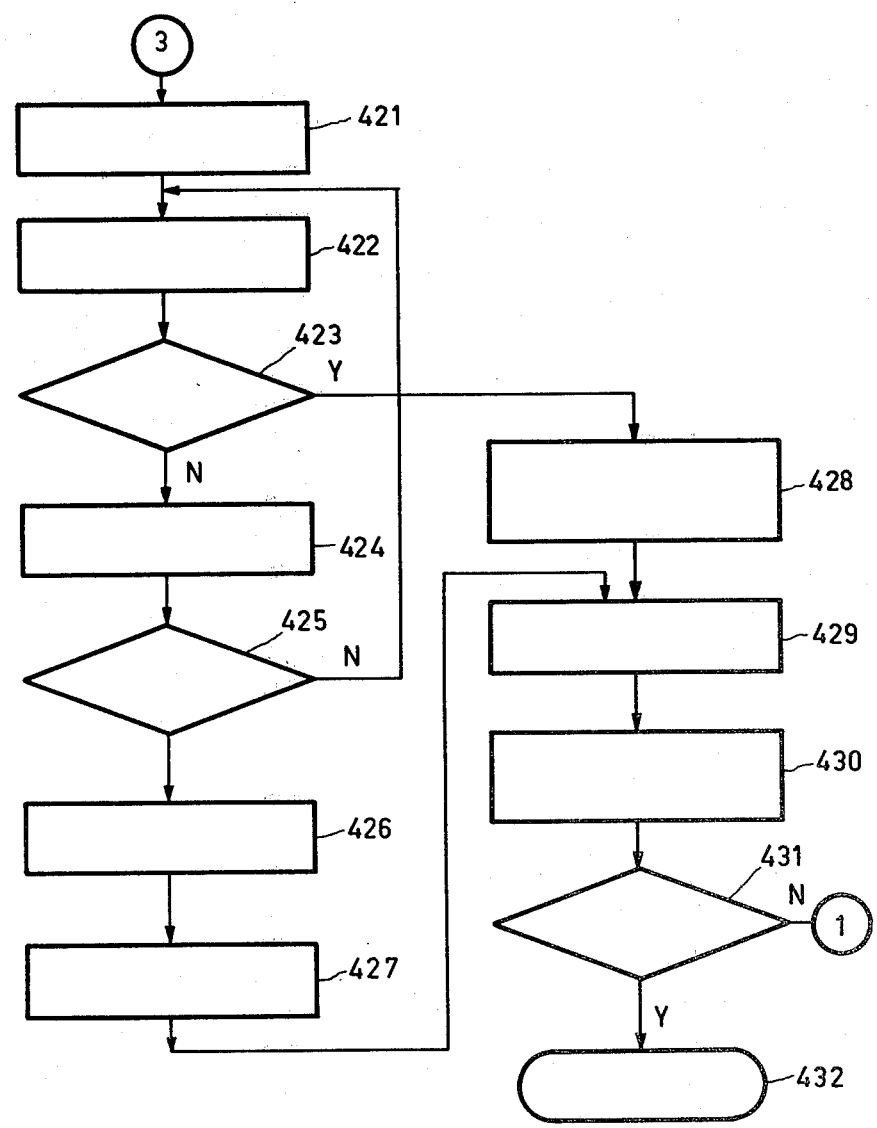

FIGS. 6a–c show a flow chart of the processing of the image data in the device shown in FIG. 3. The blocks have the following meanings:

401: start: here the writing after the 20×20 points image starts;
402: reset counter;
403: gate clock pulses to shift register 3;
404: read and store data;
405: increment counter 7;
406: counter=400?: has the sub-image been read?;
407: adddress initial focussing point memory 9;
408: store focussing point in registers 303, 304: store the addresses (x,y);
409: start shift register clock 302;
410: step in + or − x-direction: make a positive, negative or zero step in the x-direction under the control of comparison element 304;
411: step in + or − y-direction: do the same in the y-direction under the control of comparison element 314;
412: shift register 3 settled?

413: stop shift register clock 302;
414: activate moment determining unit: activate the device 21 for determining the moments by the blocking of unit 15;
415: increment step counter 174;
416: counter 174 full?
417: determine point-wise gradient in window (element 20);
418: determine x, y moments: determine the moments of the gradient in the x direction and y direction in element 21;
419: x or y moment out of limit?
420: step window in ±x, ±y direction: perform one step in ±x direction, ±y direction, or a step zero in order to reduce the said moment;
421: enable comparison element 26;
422: call reference pattern: read memory 25 for a reference pattern;
423: correspondence?: does the unknown pattern correspond to the pattern stored?
424: increment address counter: increment position of the address counter 30;
425: correspondence to stored adddress?: does the position of the address counter correspond to the content of counter 34?
426: store new reference pattern: store the unknown pattern as a new reference pattern in memory 25;
427: increment stored address counter 34;
428: store address and window coordinates in bookkeeping memory: store the address in memory 25 and the coordinates of the registers 13, 14 in the memory 29;
429: disable comparison unit: terminate the activation of the comparison element 26 by setting the element 15 to the blocking position again;
430: increment address of initial focussing point memory: increment the position of the address counter of the memory 9 for the initial focussing points;
431: address overflow?: have all initial focussing points been dealt with?;
432: stop.

A slightly different solution instead of the foregoing is as follows:

421 reset address reference memory: set address counter 50 to zero;
422: call reference pattern and enable comparison element 26; read memory 25 for a reference pattern and activate comparison element 26.

What is claimed is:

1. A device for recognizing a pattern of a predetermined number of separate digital signals which are arranged according to at least one coordinate and each of which has a signal value, the device comprising an input with first storage means for receiving and storing said pattern, second storage means with a predetermined number of storage locations, each of which has a storage capacity for a corresponding pattern, a difference determining device with a first input which is connected to a data output of the first storage means, a second input which is connected to a data output of the second storage means, and an output for alternatively supplying a non-correspondence/correspondence signal, characterized in that for the recognition of a local pattern which is selected from a overall pattern by way of a coordinate-wise adjustable window device, the window device comprises a stepping mechanism in order to be adjusted coordinate-wise over a step, a gradient determining device being provided for determining, for predetermined coordinate values within the window, the absolute value of a coordinate-wise gradient of the values of said digital signals prevailing at said coordinate values, a moment generator for receiving said absolute values and for determining a moment thereof with respect to a reference point of the window, and for generating an output signal when a predetermined minimum value of said moment is reached in order to indicate that a local high value is reached of the value of said coordinate-wise gradient averaged over the local pattern, a connection being provided for supplying said output signal as an activation signal to said difference determining device.

2. A device as claimed in claim 1, characterized in that there is provided a preadjustment stepping mechanism in order to impart, by way of a predetermined number of preadjustment steps, a corresponding number of starting positions to the window device, an output of the preadjustment stepping mechanism being connected to an input of the moment generator in order to activate the latter only after a starting point has been reached.

3. A device as claimed in claim 2, characterized in that there is provided a feedback connection between an output of the moment generator and an activation input of the stepping mechanism in order to supply the stepping mechanism with a step direction signal.

4. A device as claimed in claim 3, characterized in that there is provided a termination element for imposing an upper limit to the number of steps which can be activated from a starting position by a step direction signal applied to the stepping mechanism.

5. A device for recognizing a pattern of a predetermined number of separate digital signals which are arranged according to at least one coordinate and each of which has a signal value, the device comprising an input with first storage means for receiving and storing said pattern, second storage means with a predetermined number of storage locations, each of which has a storage capacity for a corresponding pattern, a difference determining device with a first input which is connected to a data output of the first storage means, a second input which is connected to the data output of the second storage means, and an output for alternatively supplying a non-correspondence/correspondence signal, characterized in that for the recognition of a local pattern selected from an overall pattern by means of a window device which can be focussed coordinate-wise, the window device comprises a stepping mechanism in order to be focussed coordinate-wise over a step, a gradient determining device being provided for determining, for predetermined coordinate values within the window, the absolute value of a coordinate-wise gradient of the values of said digital signals prevailing at said coordinate values, the difference determining device comprising means which serve to ignore the predetermined difference generated for a given coordinate value if a pair of signals from first and second storage means which is presented for comparison exhibits a predetermined difference for said coordinate value while the relevant patterns both have a predetermined coordinate-wise gradient in the signal value for said coordinate value.

6. A device as claimed in any of the claims 1 to 5, characterized in that there are provided third storage means for storing, under the control of a correspondence signal from the difference determining device, a reference position of the window then prevailing and an address signal for the second storage means.

7. A device as claimed in claim 6, characterized in that there is provided a moment generator for receiving said absolute values and for determining a moment thereof with respect to a reference point of the window, and for generating an output signal when a predetermined minimum value of said moment is reached in order to indicate that a local high value is reached of the value of said coordinate-wise gradient as averaged over the local pattern, a connection being provided for supplying said output signal as an activation signal to said difference determining device, there also being provided a cycle generator for presenting the respective stored data from the second storage means to the difference determining device, said "correspondence" signal acting as a first stop signal for signalling a recognition, a "non-correspondence" signal acting as a proceed signal for presenting further patterns stored in the second storage means for comparison until all patterns have been presented, a second stop signal acting to unblock a blocking element between an output of the first storage means and an input of the second storage means in order to store the pattern stored in the first storage means at a vacant storage location in said second storage means.

8. A device as claimed in claim 7, in which there is provided a feedback connection between an output of the moment generator and an activation input of the stepping mechanism in order to supply the stepping mechanism with a step direction signal, characterized in that there are provided fourth storage means for the intermediate storage after all patterns stored in the second storage means have been presented, of a reference position of the window device then prevailing, there being provided a repetition device for generating at least one additional starting position, and there also being provided a comparison element for comparing, after the minimum value of said moment has subsequently been reached again, the reference position of the window device then pre-vailing with that storing the fourth storage means, and for forming a running total of correspondences and for ultimately generating said second stop signal after a predetermined minimum total has reached, starting from said at least one additional starting position.

9. A device as claimed in claim 7, in which there is provided a feedback connection between an output of the moment generator and an activation input of the stepping mechanism in order to supply the stepping mechanism with a step direction signal, characterized in that there are provided fifth storage means for storing, under the control of said second stop signal, a provisionality flag signal and for forming a running total, there being provided a repetition device for generating at least one additional starting position and for incrementing the running total by a subsequent first stop signal for the pattern most recently stored in the second storage means in order to reset, starting from said at least one additional starting position, said provisionality flag signal only when a predetermined minimum running total is reached, but to invalidate the latter pattern, otherwise.

10. A device as claimed in claim 9, characterized in that a second window device is connected to a data connection of the second storage means in order to limit activated supply of data to the difference determining device to coordinate positions for a pattern to be stored in said second storage means for which either a predetermined coordinate-wise gradient of said signal value is detected or for which a predetermined coordinate-wise gradient of said signal value is detected at a neighbouring coordinate position.

* * * * *